US012123953B1

(12) United States Patent
Collier et al.

(10) Patent No.: US 12,123,953 B1
(45) Date of Patent: Oct. 22, 2024

(54) UNIFIED SPATIAL-TEMPORAL PHASE DEPTH SENSING

(71) Applicant: Focal Length LLC, Park City, UT (US)

(72) Inventors: Robert John Collier, Park City, UT (US); Trevor Shay Strickler, Scottsdale, AZ (US)

(73) Assignee: Focal Length LLC, Park City, UT (US)

( * ) Notice: Subject to any disclaimer, the term of this patent is extended or adjusted under 35 U.S.C. 154(b) by 224 days.

(21) Appl. No.: 17/685,627

(22) Filed: Mar. 3, 2022

Related U.S. Application Data

(60) Provisional application No. 63/155,820, filed on Mar. 3, 2021.

(51) Int. Cl.
*G01S 17/894* (2020.01)
*G01S 7/481* (2006.01)
(Continued)

(52) U.S. Cl.
CPC .......... *G01S 17/894* (2020.01); *G01S 7/4815* (2013.01); *G01S 7/4918* (2013.01); *G06T 7/521* (2017.01);
(Continued)

(58) Field of Classification Search
CPC .... G01S 17/894; G01S 7/4815; G01S 7/4918; G06T 7/55; G06T 7/521;
(Continued)

(56) References Cited

U.S. PATENT DOCUMENTS

| 11,029,149 B2 * | 6/2021 | Ortiz Egea | ............ H04N 23/56 |
| 2014/0211193 A1 * | 7/2014 | Bloom | ............... G01B 11/2527 356/5.01 |

(Continued)

FOREIGN PATENT DOCUMENTS

WO  2021113645 A1  6/2021

OTHER PUBLICATIONS

Kushida et al. "Spatio-temporal Phase Disambiguation in Depth Sensing", IEEE, 2019.*

(Continued)

*Primary Examiner* — James T Boylan
(74) *Attorney, Agent, or Firm* — Blank Rome LLP

(57) ABSTRACT

A three-dimensional depth capture system based on active light projection. The system includes a light projector, a camera, and a data processing system. The light projector can project a spatial-temporal light pattern over a two-dimensional field-of-view configured to measure three-dimensional depth of objects illuminated by the light pattern. The light pattern can be projected as a finite sequence of discrete frames. A propagating light field of each of discrete frame can have a spatial intensity pattern. The projected discrete frames can be mathematically described as a product of separated spatial and temporal functions, where the camera functions to image objects illuminated by the projector. The camera can be positioned at a finite baseline distance from the projector, following geometrical guidance (Continued)

of structured light triangulation depth sensing. The camera can have a time-of-flight (TOF) sensor, where the sensor is temporally synchronized with the projector.

15 Claims, 7 Drawing Sheets

(51) Int. Cl.
- *G01S 7/4912* (2020.01)
- *G06T 7/521* (2017.01)
- *G06T 7/55* (2017.01)
- *H04N 23/56* (2023.01)

(52) U.S. Cl.
CPC ............... *G06T 7/55* (2017.01); *H04N 23/56* (2023.01); *G06T 2207/10028* (2013.01); *G06T 2207/10152* (2013.01)

(58) Field of Classification Search
CPC ........... G06T 2207/10028; G06T 2207/10152; H04N 23/56
See application file for complete search history.

(56) References Cited

U.S. PATENT DOCUMENTS

| | | | |
|---|---|---|---|
| 2015/0062558 A1* | 3/2015 | Koppal | G01B 11/2527 |
| | | | 356/5.01 |
| 2017/0206660 A1* | 7/2017 | Trail | G06T 7/521 |
| 2018/0341008 A1* | 11/2018 | Ortiz Egea | G01S 17/894 |
| 2020/0309955 A1* | 10/2020 | Laflaquière | G01S 17/10 |
| 2021/0048531 A1* | 2/2021 | Medower | G01S 7/4815 |
| 2021/0334992 A1* | 10/2021 | Nistico | G01B 11/2513 |
| 2022/0091269 A1* | 3/2022 | Buettgen | G01S 17/32 |

OTHER PUBLICATIONS

International Search Report dated Mar. 29, 2021; International Application No. PCT/US2020/063323; International Filing Date: Dec. 4, 2020; 3 pages.

Written Opinion dated Mar. 29, 2021; International Application No. PCT/US2020/063323; International Filing Date: Dec. 4, 2020; 5 pages.

* cited by examiner

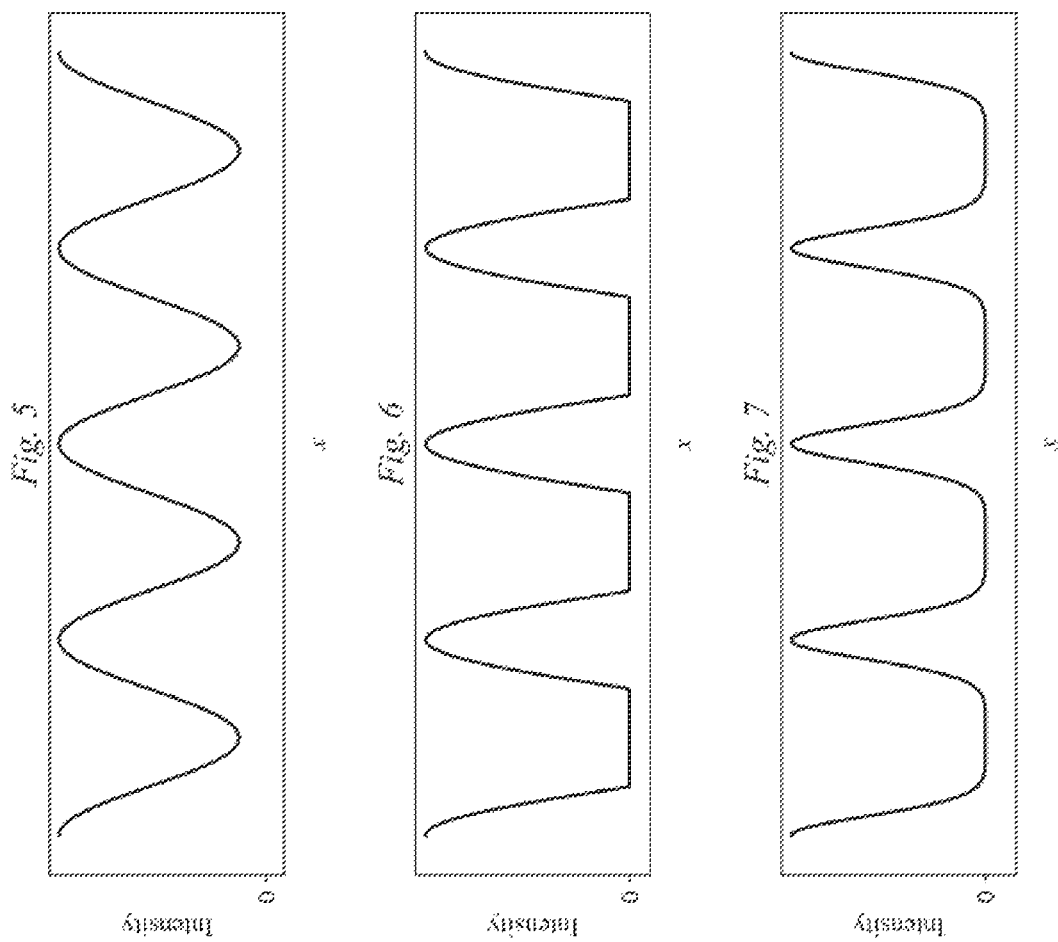

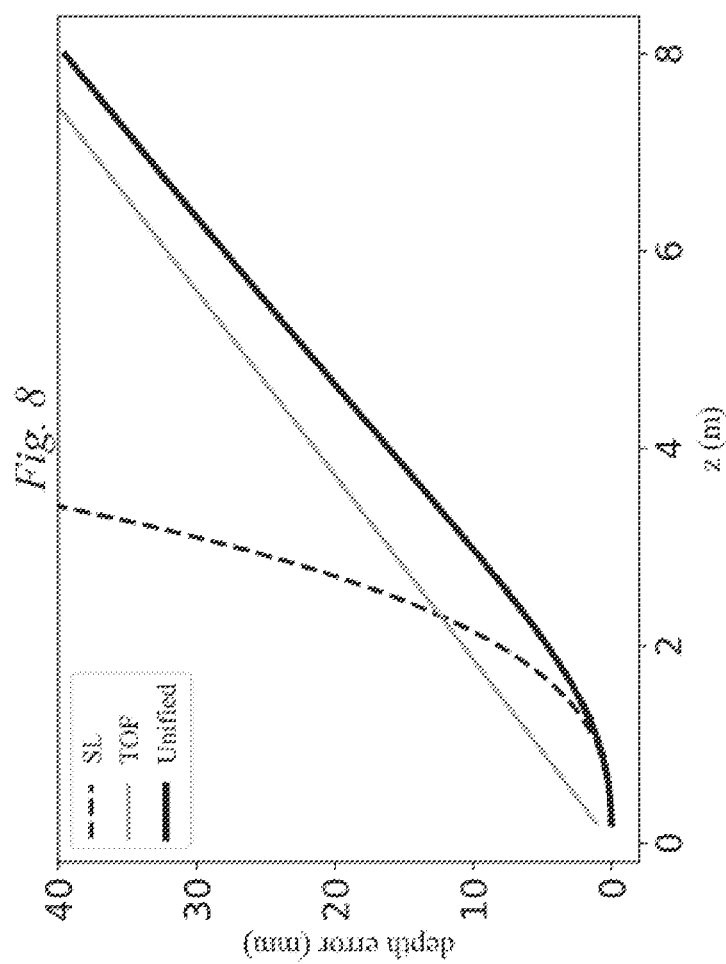

UNIFIED SPATIAL-TEMPORAL PHASE DEPTH SENSING

RELATED APPLICATION

This application claims benefit of priority of U.S. Provisional Application Ser. No. 63/155,820, filed Mar. 3, 2021; which application is incorporated herein by reference.

FIELD OF INVENTION

The present invention relates to a system and method of optical depth measurement; and more particularly to a system and method that unifies elements of Time-of-Flight (TOF) sensing with Structured Light (SL), thereby obtaining advantages of both.

BACKGROUND OF THE INVENTION

Three-dimensional (3D) sensing is a major commercial and academic area of research with applications in computer vision, robotics and manufacturing, among other fields. While there are many approaches to 3D sensing, the present invention involves methods and systems of active optical 3D sensing wherein a light projector illuminates a field-of-view and a sensor records light reflected from objects within this field-of-view to measure distance to points on the objects. Two categories of active optical scanning are indirect Time-of-Flight (TOF) and Structured Light (SL) phase shift methods. In these methods, the 3D depth information is extracted based on the known geometrical relationships of the light projector, the light pattern/modulation, and the camera.

In the TOF approach, a projector emits a periodic light signal modulated in time with some known frequency $f_M$. The signal can be considered to have some given amplitude, frequency, and phase. This light signal illuminates physical surfaces that are to be scanned and located in three-dimensional space. Because of the finite time required for light to travel from projector to the object and from the object to the camera, there is a phase difference in the modulated light signal at the camera relative to the projector. To measure this phase shift, the camera has a specialized TOF imaging sensor. Several implementations of TOF sensors exist. One common implementation is a photosensitive pixel array in which all the pixels are modulated by a control signal which enables or disables their photosensitivity. This modulation is synchronous with the projector light frequency. Thereby, each pixel acts as a phase discriminator of the light signal. Each pixel thus outputs a phase measurement, which, along with known quantities for the system geometry and speed of light, allows the location of points on a scanned object to be measured in 3D space.

A representative example of a TOF sensor is the Current-Assisted Photonic Demodulator (CAPD) pixel array. A CAPD pixel is similar to a conventional camera sensor pixel in that it is a photosensitive element that converts incident photons into an electronic signal. This signal is made up of electrons liberated by the photons in a photodiode with some quantum efficiency $Q_E$. In a conventional imaging sensor, each pixel typically has a single sensing well, or 'bucket,' to capacitively store the electron counts during an imaging exposure. After the exposure is taken, the pixel counts are read into a computer and stored as an intensity image with pixel values proportional to the number of photons incident during the exposure time. In the CAPD or similar sensor, there are typically multiple buckets per pixel, and the photosensitivity of these buckets is modulated at or near the frequency $f_M$ of the projector signal and synchronized relative to the projector signal. Each bucket is modulated with a unique phase offset with respect to the projector, and the overall phase of the modulation can be shifted as well. This way, multiple images taken at different phases of the light signal can be made. For example, a two bucket CAPD pixel can make two phase images per exposure, and with two exposures can yield four phase images of the light signal. These phase images are equivalent to samples of the light modulation taken at different points in the modulation period, allowing the phase of the light signal to be demodulated—i.e., the phase samples are used to solve for the phase delay. The functionality of other types of TOF sensors may vary from this description, but generally they all sample the received light signal and use these samples to determine the phase delay and hence depth values.

Structured Light (SL), in contrast to time-of-flight techniques, utilizes spatial patterns rather than temporal modulation to measure depth. There are a wide variety of SL concepts, but most relevant to this invention is the phase shift SL method. Phase shift SL sensing utilizes a light projector that emits a periodic spatial pattern for which a positional phase may be defined. A common example of such a pattern is a one-dimensional sinusoidal function. A conventional camera is used to image objects illuminated by the SL projector. If a line of sight from the camera sensor crosses the field-of-view of the structured light projector, the line will intersect values of phase in the light pattern that each correspond to a particular distance from the camera. Typically, more than one exposure frame is collected by a camera to make phase shift measurements. In each frame, the light pattern is projected with a different spatial phase offset so that each collected image frame is of a unique phase shift value. These unique phase samples can be used to determine the spatial phase and hence the distance from the camera to a surface point being imaged.

The TOF and SL methods each have unique advantages and disadvantages. A significant difference between them is that SL systems typically have lower depth uncertainty, and thus higher depth resolution, at near range than TOF systems. Conversely, TOF systems typically have better depth resolution, and lower depth uncertainty, at far range than SL systems. This suggests an advantage in combining both techniques to achieve a system that performs better and both near and far distances.

Prior systems have been described in which TOF and SL aspects have been incorporated into a single device to take advantage of the benefits of both techniques. Spatial structure has been introduced into TOF light projectors, and some devices can switch between TOF and SL depending on the target range of the scene to be measured. However, the present invention combines TOF and SL in such a way to produce a measurement of distance from a single unified spatial-temporal phase value at all locations in the field of view. The present invention uses a discrete number of spatial patterns projected sequentially such that the spatial and temporal phases of each frame are correlated to yield a signal dependent on a single, unified spatial-temporal phase. The result is a method of depth sensing that obtains reduced measurement uncertainty over a wider depth range than either TOF or SL alone, but all from a single-phase quantity. This system is neither a SL nor a TOF system, but a new, unique category of system and method.

By yielding a 3D measurement with reduced uncertainty, existing uses for 3D sensors can operate with better performance and lower noise. Additionally, future applications for 3D sensing, such as biometric security, gaming and humanmachine interface are likely to demand very high resolution, with low uncertainty, needs which can be met optimally with this device.

SUMMARY OF THE INVENTION

A three-dimensional depth capture system based on active light projection. The system includes a light projector, a camera, and a data processing system. The light projector can project a spatial-temporal light pattern over a two-dimensional field-of-view configured to measure three-dimensional depth of objects illuminated by the light pattern. The light pattern can be projected as a finite sequence of discrete frames. A propagating light field of each of discrete frame can have a spatial intensity pattern. The projected discrete frames can be mathematically described as a product of separated spatial and temporal functions, where the camera functions to image objects illuminated by the projector. The camera can be positioned at a finite baseline distance from the projector, following geometrical guidance of structured light triangulation depth sensing. The camera can have a time-of-flight (TOF) sensor, where the sensor is temporally synchronized with the projector. Spatial and temporal information is collected and analyzed by the data processing system.

The present invention also provides a method for three-dimensional depth capture based on active light projection. The method includes projecting a spatial-temporal light pattern, using a light projector, over a two-dimensional field-of-view for measuring three-dimensional depth of objects illuminated by the light pattern. Objects illuminated by the light projector are imaged, using a camera. The camera can be positioned at a finite baseline distance from the light projector. The camera can have a time-of-flight (TOF) sensor temporally synchronized with the light projector. Spatial and temporal function information of the spatial-temporal light pattern are collected, using the camera, and are analyzed using a data processing system. The light pattern is projected as a finite sequence of discrete frames mathematically described as a product of separated spatial and temporal functions, and a propagating light field of each of the projected discrete frames has a spatial intensity pattern.

The system and/or method of the present invention include multiple aspects and embodiments. For example, in one aspect, the light projector can further include one or more light emitting diodes or lasers controlled independently, providing that light may be output from different areas at different times. In another aspect, the light projector can further include one or more arrays of light emitting diodes or lasers, each having one or more discrete zones, each discrete zone containing one or more emitters configured to operate independently, providing that light may be output from different areas at different times.

In still another aspect, the method or system can further include or use one or more high-contrast diffractive optical elements divided into different zones, each zone having a uniquely controlled light source or sources, where each zone is configured to produce a projected light field, wherein one or more discrete, unique light projections are output by toggling the light source or sources. In a further aspect, the method or system can further include one or more amplitude masks divided into different zones, each zone having a uniquely controlled light source, where each zone is configured to produce a projected light field, where one or more light projections are projected by modulating the light source.

In a still further aspect, each frame of the projected sequence of discrete frames has a spatial pattern that is periodic in one axis of a field-of-view with a plurality of intensity minima and maxima. In this embodiment, for each discrete frame, the periodic pattern is shifted in a direction of periodicity by some fraction of a period to give a unique spatial phase value for each projected frame, where phase is defined according to conventions of trigonometric functions and signal analysis.

In one embodiment, the TOF sensor includes photon sensitivities of sensor pixels modulated for demodulation and phase discrimination of the temporally modulated light pattern. The TOF sensor can be synchronized to the light projector where sensor demodulation timing is set relative to the projected light pattern.

In one aspect therein, the discrete frames are projected as a sequence from the light projector, each with unique spatial phase values, all have a temporal intensity modulation periodic in time that operates for an indefinite, selectable number of modulation periods during operation. In this aspect, the discrete frames, projected with the same temporal waveform, each have a unique temporal phase offset correlated to the unique spatial phase of each frame, where a total summed signal of all the discrete frames is a spatial-temporal signal predominately, or in part, a function of a unified spatial-temporal phase. The unified spatial-temporal phase can be defined as, $\phi\_T=\phi\_TOF+\phi\_SL$, where $\phi\_TOF$ is temporal phase, $\phi\_SL$ is spatial phase, and a sign convention is assumed in which $\phi\_TOF$ and $\phi\_SL$ increase in a same direction along a line of sight from the camera.

Furthering this aspect, a frequency of the temporal intensity modulation of the projected discrete frames can be the same as, or very close to, a TOF demodulation signal frequency. The TOF sensor can be configured to capture a plurality of images of projector illuminated objects. Each of the plurality of captured images can be centered in time at a unique temporal phase offset relative to the projected light pattern. The data processing system can then be configured to determine a total unified spatial-temporal phase of the light pattern of the plurality of captured images centered at the unique temporal phase offsets.

In one aspect therein, the data processing system can also be configured to define one or both of the spatial and temporal light patterns of the projected discrete frames to optimize modulation depth, also known as signal amplitude, received by the TOF sensor. In another aspect therein, the data processing system can be configured to define one or both of the spatial and temporal patterns of the projected discrete frames to result in a relationship between real-depth and measured phase at the TOF sensor being linear, or close to linear, with harmonic ripple or non-linearity minimized. In still another aspect therein, the data processing system can be configured to define one or both of the spatial and temporal patterns of the projected discrete frames to be a continuous, single-frequency sinusoid with a constant DC offset term, where total signal is non-negative.

Further aspects therein include the data processing system being configured to define one or both of the spatial and temporal patterns of the projected discrete frames to be a 'truncated sinusoid,' defined to be a single frequency sinusoidal function having negative values truncated, or clipped, at 0 value, where each period of the sinusoidal function has a single positive sinusoidal peak and 0 value elsewhere, and may or may not have a constant-valued intensity offset. In another, the data processing system can be configured to define one or both of the spatial and temporal patterns of the projected discrete frames to be a 'periodic Gaussian function,' or a 'periodic normal function,' which is a periodic sequence of Gaussian distribution functions with peak width parameters determined by design-specific requirements.

In still another aspect therein, the data processing system can be configured to define one or both of the spatial and temporal patterns of the projected discrete frames to be a periodic function that is a finite sum of 'harmonic sinusoids,' defined as sinusoidal functions with periods that are integer multiples of a single fundamental period. The number and relative amplitudes of each harmonic term of a sum thereof can be chosen to maximize amplitude of one or more of the harmonic terms relative to other signal components, thereby enhancing phase measurement precision. In a further aspect therein, the data processing system can be configured to define the spatial and temporal patterns of the projected discrete frames to be approximated as a Fourier series, defined as a finite or infinite sum of discrete harmonic sinusoidal terms with periods that are integer multiples of a fundamental period. The function and unique phase offsets of the discrete frames can be defined, where, a summed signal of all the discrete frames is predominately a function of a fundamental harmonic term of the series having a period equal to a fundamental period, where amplitudes of constant-valued and higher harmonic terms are minimized to enhance precision and accuracy of phase measurement.

In another embodiment, the data processing system can be configured to measure a phase value of a pattern with multiple periods, and where ambiguity in measuring the phase value of the pattern with multiple periods is resolved to an unambiguous result by the data processing system being further configured, such that alternating phase or depth captures, each of which may include a plurality of image frames captured at unique temporal phases, to use temporal modulation frequencies that differ by a fraction of their values. Phase values can be captured from sequential phase or depth captures from nearly a same point in space are subtracted to yield a difference phase corresponding to a period that spans an entire depth range of interest. The difference phase can be used to locate, unambiguously, which high frequency period each phase is in, whereby the resultant depth value is unambiguous. The difference phase measurement is typically of lower precision than the phase values calculated from each individual phase or depth captures, where the individual phase captures using higher frequencies are used to enhance a precision of the difference phase measurement.

In still another embodiment, the data processing system can be configured to measure a phase value of a pattern with multiple periods, and where ambiguity in measuring the phase value of the pattern with multiple periods is resolved to an unambiguous result by the data processing system being further configured to use more than one of the discrete projected frames projected, not sequentially as in normal operation but, sequentially in phase. The light pattern described by the more than one discrete frame projected simultaneously can have minimal spatial structure and is a pure time-of-flight signal. The pure time-of-flight signal can be operated at a low enough frequency to provide unambiguous unwrapping of phase values measured immediately before or after the said pure time-of-flight unwrapping capture.

In a further embodiment, the data processing system can be configured to measure a phase value of a pattern with multiple periods, and where ambiguity in measuring the phase value of the pattern with multiple periods is resolved to an unambiguous result by the depth capture system being configured to use a separate projector to project a pure time-of-flight signal modulated at a frequency that allows unambiguous phase unwrapping of measured phases.

BRIEF DESCRIPTION OF THE ILLUSTRATED EMBODIMENTS

The present invention will be better understood with reference to the following description taken in combination with the drawings. For the purpose of illustration, there are shown in the drawings certain embodiments of the present invention. In the drawings, like numerals indicate like elements throughout. It should be understood, however, that the invention is not limited to the precise arrangements, dimensions, and instruments shown:

FIG. 5 illustrates an exemplary sinusoidal intensity plot;

FIG. 6 illustrates an exemplary truncated cosine intensity plot;

FIG. 7 illustrates an exemplary Gaussian pulse intensity plot;

FIG. 8 illustrates an exemplary system performance plot; and

DETAILED DESCRIPTION OF THE ILLUSTRATED EMBODIMENTS

Figure 1:
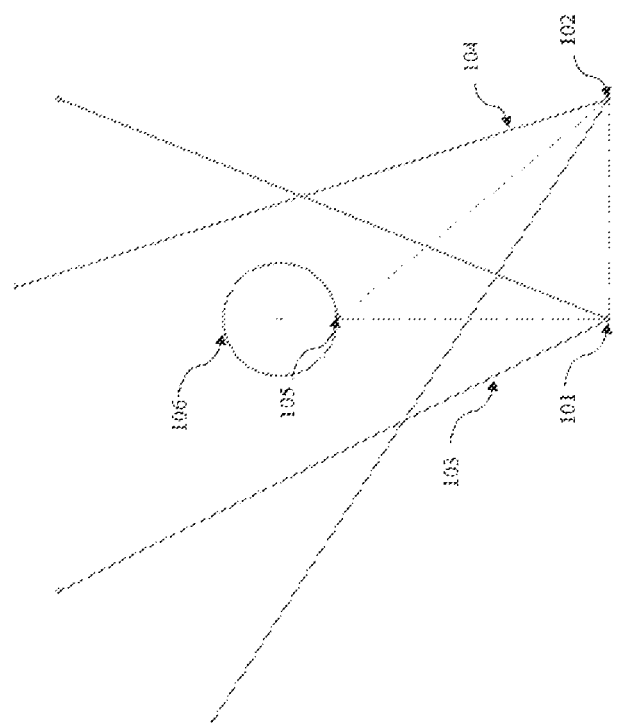
FIG. 1 illustrates a two-dimensional system geometry view of an embodiment of the present invention.

Described here is a method, system, and some system embodiments of a three-dimensional (3D) depth sensor, a general concept embodiment of which is illustrated in FIG. 1. Light is emitted from a projector unit 102 with finite field of view shown. The field of view may include one or more physical objects 106 having reflective surfaces on which a location of surface points are to be measured in three dimensions. This collection of objects within the field of view are henceforth referred to as simply 'the scene.' The light will expand within the field of view (FOV) in the vertical and horizontal directions 104. A portion of the light that reflects from the scene will be captured by a camera 101 and imaged onto a specialized high speed indirect Time-of-Flight (TOF) sensor. The fields of view of the camera and the light projector may overlap in such a way that measurements of a scene may be obtained.

Figure 2:
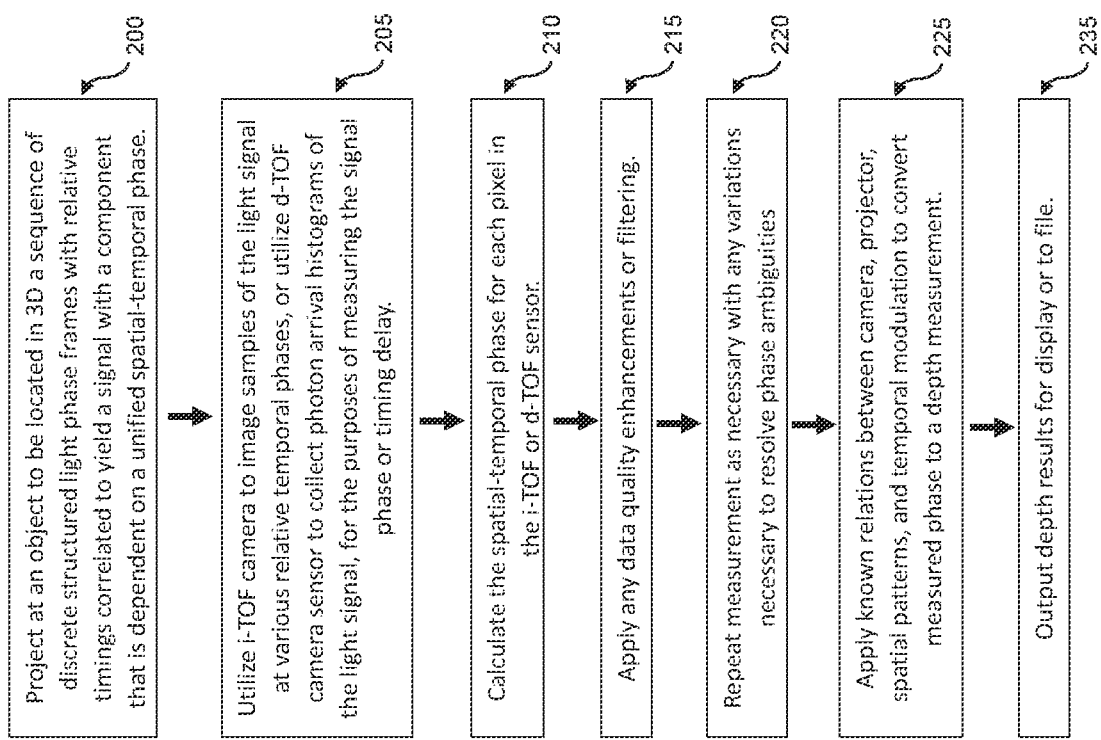
FIG. 2 illustrates a system operation flow chart, in accordance with one embodiment of the present invention, detailing data collection and processing to produce a depth measurement.

In FIG. 2, a flow chart demonstrates a flow of data collection and processing to produce a depth measurement, the details of which are described below. In step 200, a sequence of discrete, structured light phase frames, are projected at an object to be located in 3D, where the discrete frames have relative timings correlated to yield a signal with a component that is dependent on a unified spatial-temporal phase. In step 205, an i-TOF camera is used to image samples of the light signal at various relative temporal phases. Alternatively, or in addition, a d-TOF camera sensor is used to collect photon arrival histograms of the light signal. All are for the purpose of measuring signal phase or timing delay. In step 210, a spatial-temporal phase is calculated for each pixel in the i-TOF and/or d-TOF sensor. In step 215, data quality enhancements or filtering can be applied. In step 220, the measurement/calculation is repeated, as necessary, with any variations necessary, to resolve any phase ambiguities. In step 225, any known relation between camera, projector, spatial patterns, and/or temporal modulation are applied to convert measured phase to a depth measurement. In step 235, depth results are outputted for display or file recording.

Figure 4:
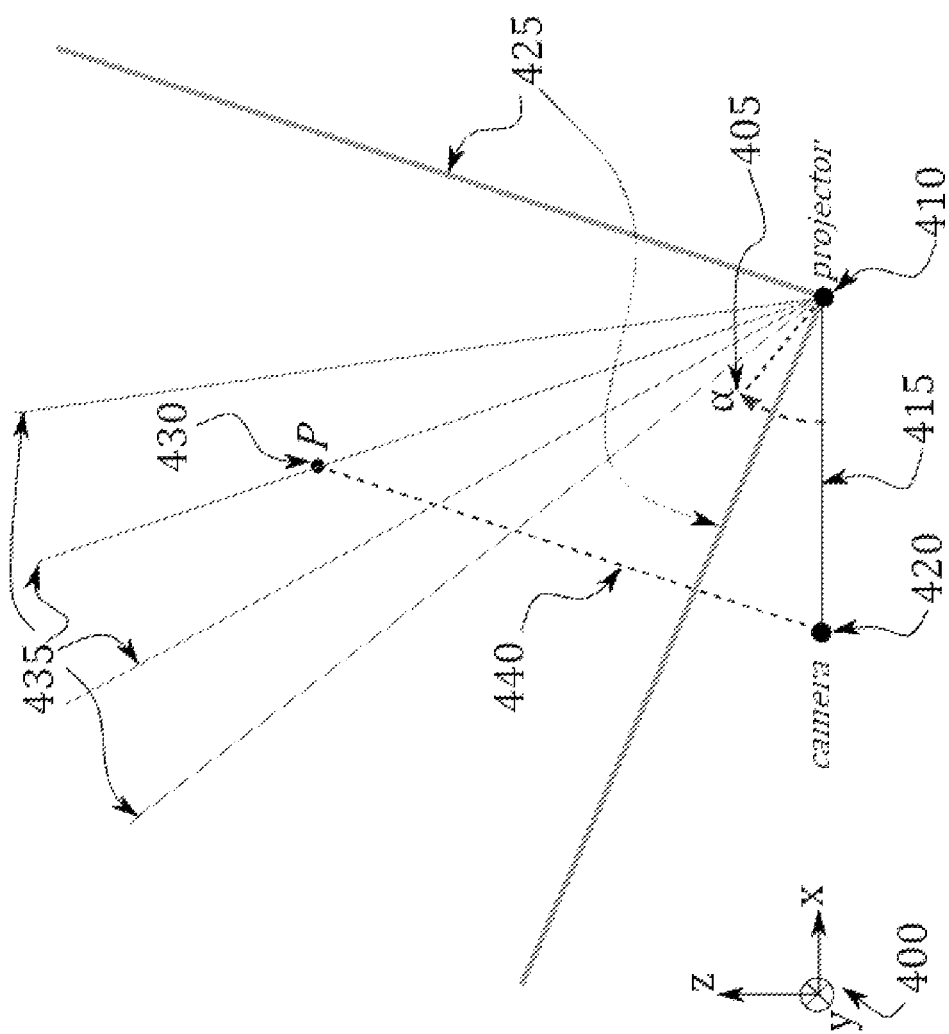
FIG. 4 illustrates exemplary system geometry with wrap points.

An example of a system coordinate convention is shown in FIG. 4. The x-axis is along the horizontal direction, perpendicular to the camera optical axis. The y-axis is a vertical direction into the paper in FIG. 4, and the z-axis is along the direction parallel to the camera optical axis. The quantity referred to as 'depth' is along the z-axis, and may be represented by the variable z.

Light emitted from the projector will have both spatial structure and temporal structure. The spatial and temporal patterns will both be periodic. For both the temporal and spatial patterns, a respective 'phase' measured in degrees or radians may be defined by the convention of trigonometry and signal analysis. Embodiments of the present invention can use correlations between the spatial and temporal phases to unify them into a single spatial-temporal phase value that are used to measure depth. In general, the novel spatial-temporal phase methods of the present invention will be referred to as the 'discrete frame, unified spatial-temporal phase methods,' with specific variant embodiments distinguished with additional descriptors.

The projected light pattern has a periodic structure along the projector's azimuthal FOV (the azimuthal angle sweeps parallel to the plane containing both the camera optical axis and the imaginary line connecting the projector aperture to the camera aperture). The periodic pattern itself may be sinusoidal in intensity, or it may be some other function that is periodic in the azimuthal FOV, such as a repeated pattern of sharp or smooth stripes, or even a more complex pattern. Examples include, but are not restricted to, a continuous sinusoid with DC offset (FIG. 5), a truncated sinusoid in which negative values are clipped to zero (FIG. 6), and a periodically-repeated Gaussian (normal) distribution (FIG. 7). Other functions could also be used, so long as they are periodic and non-negative everywhere, as required by the non-negative nature of light intensity.

Clearly, projecting spatially periodic light that modulates in both time and space at TOF rates [typically above 1 Mhz] is a challenging requirement. Several embodiments are capable of meeting these requirements.

A first embodiment is a transmissive diffractive optical element [DOE]. DOE elements are transmissive optical structures designed to impose a specific optical phase on coherent light that is passed. One common example is a Fresnel lens in which a small plate of glass is etched radially in repeating fractions of one wavelength of the light to be used, such that DOE acts as a lens on transmitted light. With conventional microfabrication techniques, it is possible to impose an optical phase with a DOE such that the element acts as a focusing lens, a collimation lens, a duplicator, beam splitter, or other optical element.

It can therefore be demonstrated that a DOE may be made that both generates a periodic intensity of light, and expands this image into a useful field of view. Thus, with only a laser coupled to a small DOE, a single image with periodic intensity may be projected. As described previously, it is necessary that the spatial phase be incremented in small steps at a very fast rate. To achieve this behavior, multiple DOE's may be coupled to multiple laser sources, which are then modulated in the desired order at the desired frequency.

As an example, a single DOE may be designed which imposes sinusoidal intensity into a field of view of 40×40 degrees. This DOE may be illuminated with a single laser source, such as an infrared edge-emitting diode. Four such instances of this device may be made, and mounted in close proximity to each other. The DOE for each unique instance may impose a spatial phase that is shifted by $\frac{1}{4}^{th}$ of a period. By powering each laser diode in turn, for roughly ¼ period, at a rate synchronous with the sensor, perhaps 100 Mhz, a useful system may be made functional.

In order to decrease the size and complexity of the above example, another embodiment is described. In this embodiment, an array of laser emitters, such as a Vertical Cavity Surface Emitter [VCSEL] array, may be built such that different zones of emitters may be controlled separately from other zones on the array.

Figure 3:
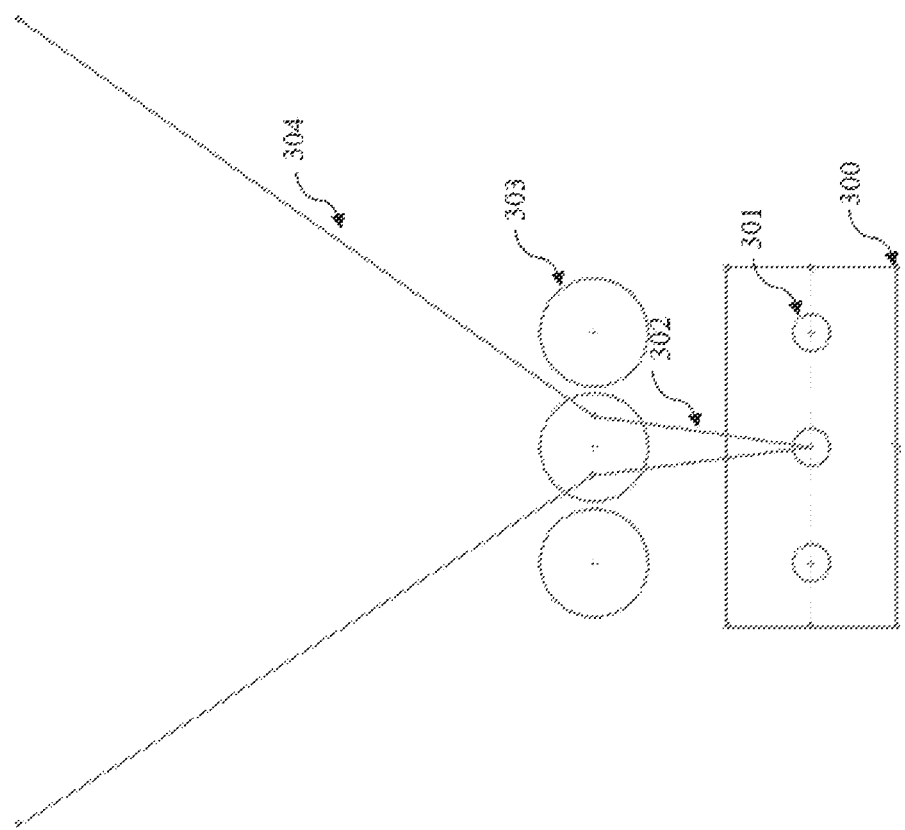
FIG. 3 illustrates an exemplary projective optics system diagram.

FIG. 3 illustrates an example, showing a light emitting chip, such as a VCSEL array 300, which includes multiple emitters or groups of emitters 301, each of which can be uniquely controlled to output an expanding field of light 302 as and when desired. The field of light can be intersected by a pattern forming element 303, such as a high-contrast optical diffractive element (DOE). These elements can be arranged such that a unique area captures the light from each unique emitter or group of emitters. The result is unique expanding fields of light 304 which overlap in space, at least partially, and which can be individually controlled in time by toggling the discrete emitters or groups of emitters comprising the light emitting chip.

In this embodiment, a 'zone' may be a regular or irregular group of emitters containing one or more emitter. An array may have two or more zones. The DOE can also be divided into zones, with a unique zone per emitter or group of connected emitters. By aligning the zones on the DOE to the zones on the Laser array, it is possible to achieve similar functionality, whereby unique phase projections can be made simply by toggling power to zones of the emitter. By rapidly modulating the different zones, a periodic projection can be made, which has a spatial frequency that remains constant, and sweeps in small steps at the rate of laser modulation.

For example, a VCSEL array containing sixteen emitters divided into four columns and four rows, with each row electrically isolated from all other rows, such that the four emitters within the row can be controlled together. This array would be paired to a DOE array, mounted a small distance in front of the emitters. The DOE array would have sixteen different active areas, each area located directly in front of an emitter. All of the active areas present would have a common design which may produce a one-dimensional sinusoid containing ten periods, into a field of view of 50×50 degrees. The design of the active area of the DOE would also have a phase associated with the periodic pattern, which would be common for all elements within a row, but shifted by ¼ of a spatial period between rows. In this case, illuminating each row of the DOE in turn, with a pulse lasting 2.5 ns with a delay of 2.5 ns between rows would appear to produce a ten period spatial sinusoid in a 50×50 degree field of view which steps through a full period in four increments at a rate of 100 Mhz. Such an embodiment would be adequate for the needs of this system.

As will be demonstrated, a preferred embodiment is one in which the spatial pulses are sharper than a sinusoid, such as a gaussian pulse for example, and in which more than four discrete phases are projected, perhaps eight, with a number of periods greater than ten, perhaps twenty.

Regardless of the specific pattern, the function of the system requires that the projected periodicity allow for the definition of the spatial 'phase' $\phi_{SL}$ that is measured in radians or degrees by convention of trigonometric functions. Assuming the periodicity is a linear function of an azimuthal directional angle $\alpha$, this phase is defined as $$\phi_{SL} = \phi_{SL,0} + 2\pi N_P \alpha/F_H,$$

where $N_P$ is the number of spatial periods in the projector horizontal FOV, $F_H$ is the angular span of the projector horizontal FOV, and $\phi_{SL,0}$ is constant that sets the 0 value of $\phi_{SL}$ at some arbitrary azimuthal direction. The sign convention of this expression is such that $\alpha$ and $\phi_{SL}$ are both clockwise positive so that if the projector is placed in the positive x-direction from the camera, the phase increases with increasing z depth. The sign convention is not required, however, and the methods described in the present invention accommodate other sign conventions without significant modification. Also, an assumption of linear phase dependence is used, here, for this example definition of the spatial phase, such linear dependence is not a requirement. The azimuthal periodicity could have some other dependence or even be irregular across the field of view while the basic functionality remains unchanged.

The number of periods $N_P$ over which $\phi_{SL}$ is defined is not strictly determined, but the more periods there are in the FOV of the projected light pattern, the better will be the depth resolution of the measurement. However, the number of periods is limited by the need to keep the size of the periods large enough to not exceed the capability of the projector or the camera to resolve the pattern. With multiple periods, multiple positions can return the same apparent signal, leading to ambiguity. This ambiguity can be resolved using specific techniques known as 'phase unwrapping.' Some techniques are known in the art, while other techniques exist that are unique to the present invention.

To clarify how the spatial phase allows for the measurement of depth, FIG. 4 shows the projector-camera geometry in the x-z plane. It is assumed for simplicity of illustration in FIG. 4 that the geometry is confined to the x-z plane, although in practice this is not a constraint on a real system and the method can accommodate measurements out of the x-z plane. Cartesian axes 400 are shown and are defined as in the previous description of FIG. 1. Azimuthal angle $\alpha$ 405 is also shown. The projector 410 is at a baseline distance b 415 from the camera aperture 420. The projector field-of-view (FOV) is the area over which light is emitted by the projector and extends in the horizontal and vertical directions. In FIG. 4, only the projector horizontal FOV 425 is shown. The Point P 430 is an arbitrary surface point the location of which is to be measured in 3D. Lines 435 of constant spatial phases $\phi_{SL}$ are shown emitting from the projector. Because of the baseline b between the projector and camera, a line of sight 440 from the camera intersects a unique spatial phase value at each position in the projector FOV. This unique spatial phase as a function of position is critical to making depth measurements in any implementation of this invention.

In the set of embodiments of the unified spatial-temporal phase method utilizing a TOF camera, referred to as 'discrete frame, unified spatial-temporal phase TOF embodiments,' or for brevity 'the embodiments,' the camera sensor will be an TOF sensor such as a Current-Assisted Photonic Demodulator (CAPD) pixel array or other TOF sensor. In conventional TOF applications, the projector emits light modulated at a frequency $f_M$, which may be as fast as hundreds of MHz or more. This light is without intentional spatial structure, other than that needed to concentrate the light within a useful field of view. The light is often produced using a VCSEL (vertical cavity surface emitting laser) coupled with a diffuser to output a uniform, spatially constant output within the field of view. The temporal modulation is periodic and has a unique temporal phase at any point along the path of travel. The difference in temporal phase between the signal at the projector and the signal after it reflects from an arbitrary surface point and arrives at the camera, is the phase delay, $\phi_{TOF}$. Defining the distance from the projector to an arbitrary point P as $D_p$ and the distance from point P to the camera as $D_C$, the total distance traveled is $D_T = D_p + D_c$. Given the finite speed of light c, the total temporal phase delay at the camera sensor is given by:

$$\phi_{TOF} = 2\pi D_T f_M/c.$$

The temporal waveform of the light signal for which the temporal phase $\phi_{TOF}$ is defined may be a pure sinusoid with DC offset (FIG. 5), a truncated sinusoid (FIG. 6), which is a pure sinusoidal function with negative values clipped to zero, or some other periodic function for which there is a well-defined temporal phase $\phi_{TOF}$. As detailed below, this temporal modulation is implemented in such a way such that $\phi_{TOF}$ is additively combined with the spatial phase $\phi_{SL}$ into a total phase $\phi_T = \phi_{SL} + \phi_{TOF}$, which may be directly measured. It is noted that the expression for $\phi_T$ as a sum is dependent on a sign convention where both $\phi_{SL}$ and $\phi_{TOF}$ both increase in the same direction along z. In general, the chosen sign conventions are not a strict requirement of the method and are arbitrarily chosen for this mathematical treatment.

Phase unification is established in the TOF embodiments by projecting a sequence of $N_p$ spatial phase frames, the entire sequence of which is to be repeated at a modulation frequency $f_M$. The temporal waveforms of each projected spatial phase frame may or may not overlap, but the overall sequence of frames will be completed within a single modulation period $1/f_M$. Each $n^{th}$ frame will have a unique spatial phase offset $\phi_n$. The particular relative timing, or relative temporal phase offset, of the temporal waveform for each $n^{th}$ frame will be set equal to the negative value of the spatial phase offset, $-\phi_n$. Typically, the phase offsets $\phi_n$ will be evenly distributed over a single period of $2\pi$ radians (360 degrees). As a specific example to illustrate the principle, there can be a case of four total frames, numbered 0 through 3, with respective spatial phase offsets $\phi_0 = 0$ degrees, $\phi_1 = 90$ degrees, $\phi_2 = 180$ degrees, and $\phi_3 = 270$ degrees. For this example, the functional forms of the spatial and temporal waveforms of the signal are assumed to be continuous sinusoids with DC offsets. A pixel on the camera sensor imaging a point P in the scene will receive this signal with the spatial and temporal phases $\phi_{SL}$ and $\phi_{TOF}$ associated with light reflected from point P. The signal at the camera sensor from the $n^{th}$ frame with spatial phase offset $\phi_n$ and temporal phase offset $-\phi_n$ may be written as $$R_n(t, \bar{x}) = \frac{1}{2}[1 + \cos(2\pi f_M t + \phi_{TOF}(D_T) + \phi_n)][R_B + R_0 \cos(\phi_{SL}(\alpha) - \phi_n)].$$

In this expression, x is the arbitrary 3D coordinate of point P, $\phi_n$ is the frame phase offset, $R_0$ is the amplitude of the sinusoidal component of the signal at the pixel in units of photons per second, and $R_B$ is the constant DC signal component in photons per second. All other terms have been previously defined. The relative values of $R_0$ and $R_B$ are semi-arbitrary, with the only restriction that $R_B$ must be at least equal to $R_0$ because of the physical reality that the photon rate will be non-negative. The spatial function has these arbitrary relative intensities because imaging contrast may not be as high as 100%, which is the case when $R_0=R_B$. In the temporal function, the dimensionless amplitudes of the sinusoidal and DC components of the temporal function are both equal because it is assumed the projector light source intensity may be fully extinguished at the minimum value of the oscillation. Writing each frame signal out explicitly and applying trigonometric identities, each signal is given by:

$$R_0(t, \bar{x}) = \frac{1}{2}[1 + \cos(2\pi f_M t + \phi_{TOF}(D_T))][R_B + R_0\cos(\phi_{SL}(\alpha))]$$

$$R_1(t, \bar{x}) = \frac{1}{2}[1 - \sin(2\pi f_M t + \phi_{TOF}(D_T))][R_B + R_0\sin(\phi_{SL}(\alpha))]$$

$$R_2(t, \bar{x}) = \frac{1}{2}[1 - \cos(2\pi f_M t + \phi_{TOF}(D_T))][R_B - R_0\cos(\phi_{SL}(\alpha))]$$

$$R_3(t, \bar{x}) = \frac{1}{2}[1 + \sin(2\pi f_M t + \phi_{TOF}(D_T))][R_B - R_0\sin(\phi_{SL}(\alpha))]$$

Summing all the N frames gives a final total signal $R_T$, $$R_T(t, \bar{x}) = \frac{N}{2}\left[R_B + \frac{1}{2}R_0\cos(2\pi f_M t + \phi_T)\right]$$

which is a spatial-temporal function with a phase offset $\phi_T = \phi_{SL} + \phi_{TOF}$.

The previous development demonstrates how the SL spatial phase and the TOF temporal phase may be unified into a single phase by projecting a sequence of discrete phase frames. However, to demonstrate the advantages of this approach, a brief analysis of the statistical uncertainty of the resultant depth measurement—i.e., the expected standard deviation—must be given. Given that the TOF sensor will capture a series of images representing photon counts from different phases of the light signal, the statistic uncertainty of the phase measurement will be a function of the uncertainties of each photon count measurement, which are described by a Poisson statistical distribution. Given a TOF signal with a sinusoidal and DC term, there are known result for the estimate of phase error derived by propagation of error techniques. These results demonstrate that the phase error $\sigma_\phi$ is proportional to the ratio of the square root of the DC amplitude to the full sinusoidal amplitude, i.e., $\sigma_\phi \propto \sqrt{R_B}/R_0$. This means that higher signal overall leads to less statistical uncertainty in the phase measurement, but also a higher ratio of the sinusoidal amplitude versus the DC amplitude improves the measurement uncertainty. For a given phase error $\sigma_\phi$, an estimate of the uncertainty in depth is given by:

$$\sigma_z^2 = (\partial z/\partial \phi_T)^2 \sigma_\phi^2 = \sigma_\phi^2/(\partial \phi_{SL}/\partial z + \partial \phi_{TOF}/\partial z)^2.$$

It is evident from this expression that if $\partial \phi_{SL}/\partial z$ and $\partial \phi_{TOF}/\partial z$ are of the same sign, then the term $(\partial \phi_{SL}/\partial z + \partial \phi_{TOF}/\partial z)^{-2}$ at all locations is of lesser magnitude than either $(\partial z/\partial \phi_{SL})^2$ or $(\partial z/\partial \phi_{TOF})^2$ alone. This implies for equal phase uncertainties across all methods, the depth error for the unified phase method is less than for SL or TOF alone. This advantage is most clear when considered near and far range limits. It is known that depth error of SL phase shift increases approximately as the $3^{rd}$ power of distance from the camera and projector. So, while SL phase shift may give good performance at near distances, its performance degrades quickly as distance increases. The depth uncertainty of TOF, however, is known to degrade linearly with distance, so it outperforms SL significantly at far distances while performing less well near the camera/projector system. To illustrate, FIG. 8 shows an exemplary plot of the depth uncertainties versus depth z that are expected for an SL system, a TOF system, and a unified phase system, assuming equal phase uncertainties. The unified phase method shows a clear performance advantage at all ranges.

Although the unified phase system performs better than TOF or SL for equal phase uncertainties, the phase uncertainties are not guaranteed to be equal across the methods. In fact, looking at the signal for the four-frame unified method derived previously, there is a factor of ½ in the sinusoidal amplitude. This factor of ½ results from canceling parts of the individual projected phase frame signals by summation and is typically not present in conventional SL or TOF methods. Therefore, the discrete frame unified method in this example actually reduces the sinusoidal amplitude and increases phase noise, which is a disadvantage. This is addressed with an additional innovation for the unified phase TOF embodiments, which is also claimed. Instead of using four frames with a continuous sinusoidal spatial function, a higher number of phase frames and a different spatial function can be used to improve the phase noise. One example of a different spatial function is a periodic Gaussian function given by $$G(\phi_{SL}) = \frac{A}{w}\sqrt{\frac{2}{\pi}}\sum_p \exp\left(-\frac{2(\phi_{SL} - \phi_{SL,0} - 2\pi p)^2}{w^2}\right).$$

In this expression, A is the area under a single Gaussian peak, w is the peak width parameter, $\phi_{SL}$ is the independent spatial phase variable, $\phi_{SL,0}$ is the phase offset of the Gaussian peaks, and p is an index for each spatial period over which the summation is made (limits of p are dependent on the number of periods $N_p$ and not shown).

Figure 9:
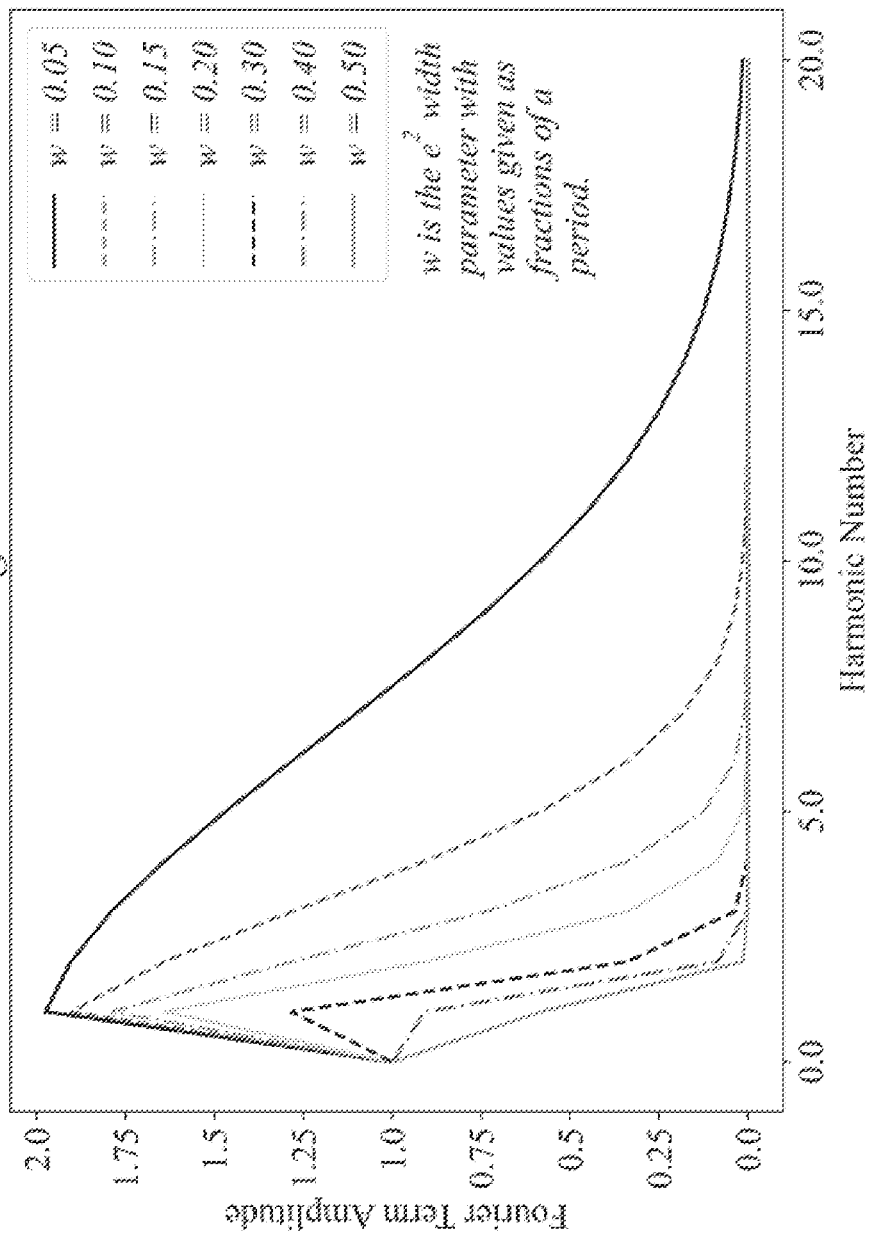
FIG. 9 illustrates an exemplary Fourier amplitude by harmonic number plot.

Because a smooth periodic function may be written as a discrete Fourier series—i.e., an infinite sum of harmonics of the period—a periodic Gaussian can be written generally as $$G(\phi_{SL}) = B_0 + \sum_{m=1}^{\infty} B_m \cos(m(\phi_{SL} - \phi_{SL,0})),$$

where the coefficients B represent amplitudes of the various harmonic terms and depend on the amplitude and width parameter. It should be noted that there are no sine terms explicitly given in this Fourier series because the periodic Gaussian is a symmetric function and therefore all the sine terms can be collected into phase-shifted cosine terms. The p=1 term, also known as the fundamental term, is the phase term of interest here that will be unified with the temporal waveform to give unified phase $\phi_T$. If the width parameter w of the periodic Gaussian is reduced and the Gaussian peak is narrowed, the ratio of the fundamental term amplitude $B_1$ to the p=0 DC term amplitude $B_0$ increases to a theoretical maximum value of two (FIG. 9 illustrates this for various values of the width parameter w). Therefore, narrower Gaussian peaks improve the signal ratio. However, the amplitudes of the higher harmonic terms also increase, and this can obscure the measurement of the total phase $\phi_T$. Some of these higher harmonics can be canceled by adding more frames, for the following reason. Previously, it was shown that the total spatial-temporal signal is a sum of the products of the temporal waveforms having phase offsets $-\phi_n$ with spatial waveforms having phase offsets $\phi_n$. Summing these $N_F$ product terms is analogous to the operation to find the amplitude $B_1$ for a finite Fourier transform of $N_F$ data points. Therefore, higher harmonics up to a Nyquist limit of $N_F/2$ (for even $N_F$) can be canceled by using $N_F$ phase frames. So, depending on application specific requirements, the design of a discrete frame TOF embodiment is a problem in which the width parameter w in the spatial term should be matched to the selected number of phase frames $N_F$ to achieve a signal with acceptably small higher harmonic content relative to the fundamental term of interest. Which value of $N_F$ to use is itself a design consideration that depends on the application and any design constraints, but any value of $N_F$ can be implemented according to the prescriptions given here and are included as embodiments of this invention.

In the limit of a very large number of frames, the Nyquist limit becomes large and the Gaussian width parameter w can be made increasingly small relative to the spatial period while still eliminating much of the higher harmonics. At the limit of an infinite number of phase frames with infinitely narrow Gaussian peaks that are effectively delta functions, the temporal pattern is projected as an apparent spatial pattern that smoothly sweeps in the azimuthal direction, covering one spatial period for every temporal period. This smooth sweep represents the upper limit for utilizing an increase in the number of discrete phase frames to reduce phase uncertainty. Practical limitations will not permit any real system to reach this limit.

In the TOF embodiments, the spatial function does not have to be a Gaussian. When the number of discrete phase frames is very large, the narrow Gaussian functions perform very well. However, it is not necessarily the case that Gaussians are optimum for a limited number of frames. Any function that has higher harmonic content that allows the fundamental term to be maximized relative to the DC term is claimed as an embodiment. As a specific example, for a given number of phase frames $N_F$, the spatial function could be constrained to have nonzero harmonic terms only below the Nyquist limit of $N_F/2$. The amplitudes of the permitted harmonics could be determined by well-known optimization algorithms with the criterion of maximizing the fundamental phase component relative to the DC component. This approach, along with any similar approach to limiting the higher harmonics while maximizing the fundamental term relative to other phase terms is claimed.

Several examples of possible spatial patterns and variations on the patterns have been given. Other variations to the spatial pattern could also be made, such as those made to compensate for real world non-idealities in the sensor, camera, projector, or any other component, or variations for any other application-specific needs. Such variations to the spatial pattern, and any necessary modifications to the data analysis to account for these variations, are anticipated modifications.

In addition to variations in the spatial pattern, variations in the temporal waveform are also possible. In the mathematical treatment given in this document, a continuous sinusoid with DC offset (FIG. 5) was used for the temporal waveform. However, there are other waveforms that are more efficient in terms of increasing signal performance for a given projector average photon emission rate. For example, if a truncated sinusoid (FIG. 6) is used for the temporal function, the peak value can be made larger for a given average photon output. Additionally, the signal measured by the i-TOF sensor has a higher ratio of the sinusoidal amplitude to the DC amplitude. Therefore, achieving better signal performance by using a truncated sinusoid for the temporal function, or by using any other similarly efficient function, is one appealing embodiment of the invention.

Also, because of physical limitations of real TOF sensors, the demodulation signal may not be ideal. In that case, the temporal waveform may be modified further based on the demodulation waveform in order to achieve optimum signal.

Other variations of the present invention can include different numbers of camera exposure frames taken. In some CAPD TOF sensors, for instance, eight phase images are typically taken to allow opportunity to balance nonidealities in the demodulation signals. Systems utilizing any number of phase images taken to enhance or modify the signal are claimed as embodiments.

For a system that projects a light pattern with multiple periods in the range of interest, there may be ambiguities when measuring phase values because multiple positions can yield the same measured signal values. In this case, phase unwrapping techniques may be applied. Several common and well-established phase unwrapping techniques exist, and may be applied to this system. Additionally, the unique nature of the system makes novel techniques for phase wrapping possible.

The group of commonly known phase unwrapping techniques is briefly described, and includes: difference-phase, multiple frequency collection, computational unwrapping, and data fusion from other sources:

The difference-phase unwrapping technique for disambiguating wrapped phases in SL or TOF is to alternate between two slightly different values of the number of periods in consecutive depth captures. By doing this, two phase values are captured the difference of which will correspond to a "difference phase" corresponding to a single period that spans a long depth range of interest. This difference phase will yield a higher uncertainty that the high period results, but it locates unambiguously in which period the depth point is located. This difference phase approach can also be applied to TOF by adjusting the modulation frequency very slightly between consecutive depth captures. This alternates between two values of the number of TOF periods in the depth range, also yielding an unambiguous difference phase. This technique can be applied to spatiotemporal depth sensing by modulating either or both the spatial and temporal frequencies.

Multiple frequency phase unwrapping is known for both SL and TOF systems, and requires that data be collected at two or more different frequencies [spatial or temporal] such that the low-frequency data contains the information to remove ambiguity, while the high-frequency data has improved resolution. This can be implemented in a spatiotemporal depth sensor by modulating either or both the spatial or temporal components of frequency.

Computational unwrapping requires only software treatment to collected data. Many specific algorithms exist, all with the goal of using only the available wrapped phase data to correctly remove ambiguities. One such example is the 'flood-fill' algorithm commonly discussed in academic literature. Such algorithms are typically general to any wrapped phase data.

Data fusion unwrapping is a family of unwrapping techniques wherein additional data from other sensing modalities is added into the computational subsystem, and used to remove ambiguities. For example, a second sensing system in a different location can provide supplemental data that once merged with the primary system permits a computational unwrapping algorithm succeed.

In the discrete frame, unified spatial-temporal phase TOF embodiments, several unique and novel variations on the difference phase unwrapping methods are possible. For instance, the temporal modulation frequency of the spatial-temporal signal can be adjusted slightly between consecutive depth captures to yield two different spatial-temporal phase values, the difference of which will just be the difference in the of the temporal phase components. This difference phase can be used for unwrapping as previously described for SL and TOF methods. Similarly, small changes to the spatial periodicity or to both the spatial and temporal periodicity in alternating depth captures can be implemented for finding a difference phase for disambiguation.

Besides the difference phase approach, other phase unwrapping techniques may also be used. For example, a pure TOF signal with no spatial component and a modulation frequency that yields an unambiguous phase in the range of interest could be implemented. This could be generated by the spatial-temporal projector system by simply using some or all of the spatial frames simultaneously to give a spatial homogenous TOF signal. Alternatively, a separate projector could be used to generate this signal. In either case, the unwrapping TOF signal could be used at intervals during system operation to assist in phase unwrapping.

What is claimed is:

1. A three-dimensional depth capture system based on active light projection, comprising:
  a light projector configured to project a spatial-temporal light pattern over a two-dimensional field-of-view for measuring three-dimensional depth of objects illuminated by the light pattern;
  a camera configured to image objects illuminated by the light projector, the camera positioned at a finite baseline distance from the light projector; and
  a data processing system;
  wherein:
    the light pattern is projected as a finite sequence of discrete frames mathematically described as a product of separated spatial and temporal functions;
    a propagating light field of each of the projected discrete frames has a spatial intensity pattern;
    the camera has a time-of-flight (TOF) sensor temporally synchronized with the light projector;
    spatial and temporal function information is collected and analyzed by the data processing system;
    the discrete frames projected as a sequence from the light projector, each with unique spatial phase values, all have a temporal intensity modulation periodic in time that operates for an indefinite, selectable number of modulation periods during operation; wherein the discrete frames, projected with the same temporal waveform, each have a unique temporal phase offset correlated to the unique spatial phase of each frame, such that a pixel on the TOF sensor that measures reflected light will receive a signal having a phase determined by position relative to the TOF sensor that is a function of both the spatial and temporal light pattern.

2. The system of claim 1, where the unified spatial-temporal phase is a function of both $\phi_{TOF}$ and $\phi_{SL}$, where $\phi_{TOF}$ is temporal phase, $\phi_{SL}$ is spatial phase, and $\phi_{TOF}$ and $\phi_{SL}$ increase in a same direction along a line of sight from the camera.

3. The system of claim 1, wherein a frequency of the temporal intensity modulation of the projected discrete frames is the same as a TOF demodulation signal frequency; where the TOF sensor is configured to capture a plurality of images of projector illuminated objects; where each of the plurality of captured images is centered in time at a unique temporal phase offset relative to the projected light pattern, and the data processing system is configured to determine a total unified spatial-temporal phase of the light pattern of the plurality of captured images centered at the unique temporal phase offsets.

4. The system of claim 3, wherein the data processing system is configured to define one or both of the spatial and temporal patterns of the projected discrete frames to optimize modulation depth, also known as signal amplitude, received by the TOF sensor.

5. The system of claim 3, wherein the data processing system is configured to define one or both of the spatial and temporal patterns of the projected discrete frames to result in a relationship between real-depth and measured phase at the TOF sensor being linear, or close to linear, with harmonic ripple or non-linearity minimized.

6. The system of claim 3, wherein the data processing system is configured to define one or both of the spatial and temporal patterns of the projected discrete frames to be a continuous, single-frequency sinusoid with a constant DC offset term, where total signal is non-negative.

7. The system of claim 3, wherein the data processing system is configured to define one or both of the spatial and temporal patterns of the projected discrete frames to be a 'truncated sinusoid,' defined to be a single frequency sinusoidal function having negative values truncated, or clipped, at 0 value, where each period of the sinusoidal function has a single positive sinusoidal peak and 0 value elsewhere, and may or may not have a constant-valued intensity offset.

8. The system of claim 3, wherein the data processing system is configured to define one or both of the spatial and temporal patterns of the projected discrete frames to be a 'periodic Gaussian function,' or a 'periodic normal function,' which is a periodic sequence of Gaussian distribution functions with peak width parameters determined by design-specific requirements.

9. The system of claim 3, wherein the data processing system is configured to define one or both of the spatial and temporal patterns of the projected discrete frames to be a periodic function that is a finite sum of 'harmonic sinusoids,' defined as sinusoidal functions with periods that are integer multiples of a single fundamental period; wherein a number and relative amplitudes of each harmonic term of a sum thereof is chosen to maximize amplitude of one or more of the harmonic terms relative to other signal components, thereby enhancing phase measurement precision.

10. The system of claim 3, wherein the data processing system is configured to define the spatial and temporal patterns of the projected discrete frames to be approximated as a Fourier series, defined as a finite or infinite sum of discrete harmonic sinusoidal terms with periods that are integer multiples of a fundamental period; wherein function and unique phase offsets of the discrete frames are defined, where, a summed signal of all the discrete frames is predominately a function of a fundamental harmonic term of the series having a period equal to a fundamental period; wherein amplitudes of constant-valued and higher harmonic terms are minimized to enhance precision and accuracy of phase measurement.

11. A three-dimensional depth capture system based on active light projection, comprising:
  a light projector configured to project a spatial-temporal light pattern over a two-dimensional field-of-view for measuring three-dimensional depth of objects illuminated by the light pattern;

a camera configured to image objects illuminated by the light projector, the camera positioned at a finite baseline distance from the light projector;

wherein:

the light pattern is projected as a finite sequence of discrete frames mathematically described as a product of separated spatial and temporal functions;

a propagating light field of each of the projected discrete frames has a spatial intensity pattern;

the camera has a time-of-flight (TOF) sensor temporally synchronized with the light projector; and a data processing system configured to collect and analyze the spatial and temporal function information, and to measure a phase value of a pattern with multiple periods, where ambiguity in measuring the phase value of the pattern with multiple periods is resolved to an unambiguous result by the data processing system being further configured such that alternating phase or depth captures, each of which may include a plurality of image frames captured at unique temporal phases, to use temporal modulation frequencies that differ by a fraction of their values; where phase values captured from sequential phase or depth captures from a same point in space are subtracted to yield a difference phase corresponding to a period that spans an entire depth range of interest; where the difference phase is used to locate, unambiguously, which high frequency period each phase is in, whereby the resultant depth value is unambiguous where individual phase captures using higher frequencies are used to establish a precision of a difference phase measurement.

12. A three-dimensional depth capture system based on active light projection, comprising:

a light projector configured to project a spatial-temporal light pattern over a two-dimensional field-of-view for measuring three-dimensional depth of objects illuminated by the light pattern;

a camera configured to image objects illuminated by the light projector, the camera positioned at a finite baseline distance from the light projector;

wherein:

the light pattern is projected as a finite sequence of discrete frames mathematically described as a product of separated spatial and temporal functions;

a propagating light field of each of the projected discrete frames has a spatial intensity pattern;

the camera has a time-of-flight (TOF) sensor temporally synchronized with the light projector; and a data processing system configured to collect and analyze the spatial and temporal function information, and to measure a phase value of a pattern with multiple periods, where ambiguity in measuring the phase value of the pattern with multiple periods is resolved to an unambiguous result by the data processing system being further configured to use multiple discrete frames projected simultaneously, wherein the simultaneously projected multiple discrete frames combine to produce constructive interference with eliminates the spatial structure of any individual frame to produce a signal that is spatially uniform, as with conventional Time-of-Flight signals; where said signal is operated at a temporal frequency yielding an unambiguous signal within a desired range of interest, which is used to unwrap phase values captured during spatio-temporally varying operation.

13. A three-dimensional depth capture system based on active light projection, comprising:

a light projector configured to project a spatial-temporal light pattern over a two-dimensional field-of-view for measuring three-dimensional depth of objects illuminated by the light pattern;

a camera configured to image objects illuminated by the light projector, the camera positioned at a finite baseline distance from the light projector;

wherein:

the light pattern is projected as a finite sequence of discrete frames mathematically described as a product of separated spatial and temporal functions;

a propagating light field of each of the projected discrete frames has a spatial intensity pattern;

the camera has a time-of-flight (TOF) sensor temporally synchronized with the light projector; and a data processing system configured to collect and analyze the spatial and temporal function information, and to measure a phase value of a pattern with multiple periods, where ambiguity in measuring the phase value of the pattern with multiple periods is resolved to an unambiguous result by the system being configured to use a separate projector to project a spatially-uniform flood signal conventional to time-of-flight systems, and modulated at a frequency that yields an unambiguous result over a desired range of interest.

14. A method for three-dimensional depth capture based on active light projection, the method comprising the steps of:

projecting a spatial-temporal light pattern, using a light projector, over a two-dimensional field-of-view for measuring three-dimensional depth of objects illuminated by the light pattern;

imaging objects illuminated by the light projector, using a camera, where the camera is positioned at a finite baseline distance from the light projector, and the camera has a time-of-flight (TOF) sensor temporally synchronized with the light projector;

collecting spatial and temporal function information of the spatial-temporal light pattern, using the camera; and analyzing the spatial and temporal function information using a data processing system;

wherein:

the light pattern is projected as a finite sequence of discrete frames mathematically described as a product of separated spatial and temporal functions;

a propagating light field of each of the projected discrete frames has a spatial intensity pattern; and the discrete frames projected as a sequence from the light projector, each with unique spatial phase values, all have a temporal intensity modulation periodic in time that operates for an indefinite, selectable number of modulation periods during operation; wherein the discrete frames, projected with the same temporal waveform, each have a unique temporal phase offset correlated to the unique spatial phase of each frame, such that a pixel on the TOF sensor that measures reflected light will receive a signal having a phase determined by position relative to the TOF sensor that is a function of both the spatial and temporal light pattern.

15. The method of claim 14, wherein the unified spatial-temporal phase is a function of both $\phi_{TOF}$ and $\phi_{SL}$, where $\phi_{TOF}$ is temporal phase, $\phi_{SL}$ is spatial phase, and $\phi_{TOF}$ and $\phi_{SL}$ increase in a same direction along a line of sight from the camera.

* * * * *